United States Patent
Guo et al.

(10) Patent No.: US 10,795,778 B2
(45) Date of Patent: Oct. 6, 2020

(54) SHARED DATA RECOVERY METHOD AND APPARATUS, COMPUTER DEVICE, AND STORAGE MEDIUM

(71) Applicant: Tencent Technology (Shenzhen) Company Limited, Shenzhen (CN)

(72) Inventors: Rui Guo, Shenzhen (CN); Maocai Li, Shenzhen (CN); Jianjun Zhang, Shenzhen (CN); Haitao Tu, Shenzhen (CN); Qi Zhao, Shenzhen (CN); Zongyou Wang, Shenzhen (CN); Jun Liang, Shenzhen (CN); Dawei Zhu, Shenzhen (CN); Lisheng Chen, Shenzhen (CN); Binhua Liu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 16/430,077

(22) Filed: Jun. 3, 2019

(65) Prior Publication Data

US 2019/0286532 A1 Sep. 19, 2019

Related U.S. Application Data

(63) Continuation of application No. PCT/CN2018/073884, filed on Jan. 23, 2018.

(30) Foreign Application Priority Data

Jan. 24, 2017 (CN) .......................... 2017 1 0055111

(51) Int. Cl.
G06F 11/14 (2006.01)
H04L 9/06 (2006.01)
(Continued)

(52) U.S. Cl.
CPC ...... G06F 11/1464 (2013.01); G06F 11/1469 (2013.01); G06F 16/1824 (2019.01);
(Continued)

(58) Field of Classification Search
CPC ............. G06F 11/1464; G06F 11/1469; H04L 9/0894; H04L 9/3239; H04L 9/0643
See application file for complete search history.

(56) References Cited

U.S. PATENT DOCUMENTS

2016/0371021 A1 12/2016 Goldberg et al.
2018/0018590 A1* 1/2018 Szeto .................. G06F 21/6254
(Continued)

FOREIGN PATENT DOCUMENTS

| CN | 102346755 A | 2/2012 |
| CN | 103488576 A | 1/2014 |

(Continued)

OTHER PUBLICATIONS

Tencent Technology, ISRWO, PCT/CN2018/073884, Apr. 18, 2018, 5 pgs.

(Continued)

*Primary Examiner* — Than Nguyen
(74) *Attorney, Agent, or Firm* — Morgan, Lewis & Bockius LLP

(57) ABSTRACT

This application relates to a shared data recovery method performed at a first node of a data sharing system. The first node obtains a first eigenvalue of a first node after receiving a recovery request carrying a first block height; broadcasts the first eigenvalue to at least one second node and recovery indication information to the at least one second node. After determining, based on the first eigenvalue and a plurality of second eigenvalues, that data in shared data stored by all nodes of the data sharing system is consistent, the first node recovers data within a range of the first block height in the (Continued)

shared data after receiving a preset quantity of a plurality of pieces of recovery indication information, thereby ensuring consistency and security of data included in a block, and reducing pressure on a node of the data sharing system to store the shared data.

20 Claims, 10 Drawing Sheets

(51) Int. Cl.
    *G06F 16/182*     (2019.01)
    *H04L 9/08*     (2006.01)
    *H04L 9/32*     (2006.01)

(52) U.S. Cl.
    CPC .......... *H04L 9/0643* (2013.01); *H04L 9/0894* (2013.01); *H04L 9/3239* (2013.01); *H04L 2209/38* (2013.01)

(56) References Cited

U.S. PATENT DOCUMENTS

| | | | |
|---|---|---|---|
| 2019/0236300 A1* | 8/2019 | Guo | G06F 21/6218 |
| 2019/0279172 A1* | 9/2019 | Duffield | G06Q 20/02 |
| 2019/0394019 A1* | 12/2019 | Gao | H04L 9/30 |

FOREIGN PATENT DOCUMENTS

| | | |
|---|---|---|
| CN | 106201742 A | 12/2016 |
| JP | 2013171483 A | 9/2013 |

OTHER PUBLICATIONS

Tencent Technology, IPRP, PCT/CN2018/073884, Jul. 30, 2019, 4 pgs.

\* cited by examiner

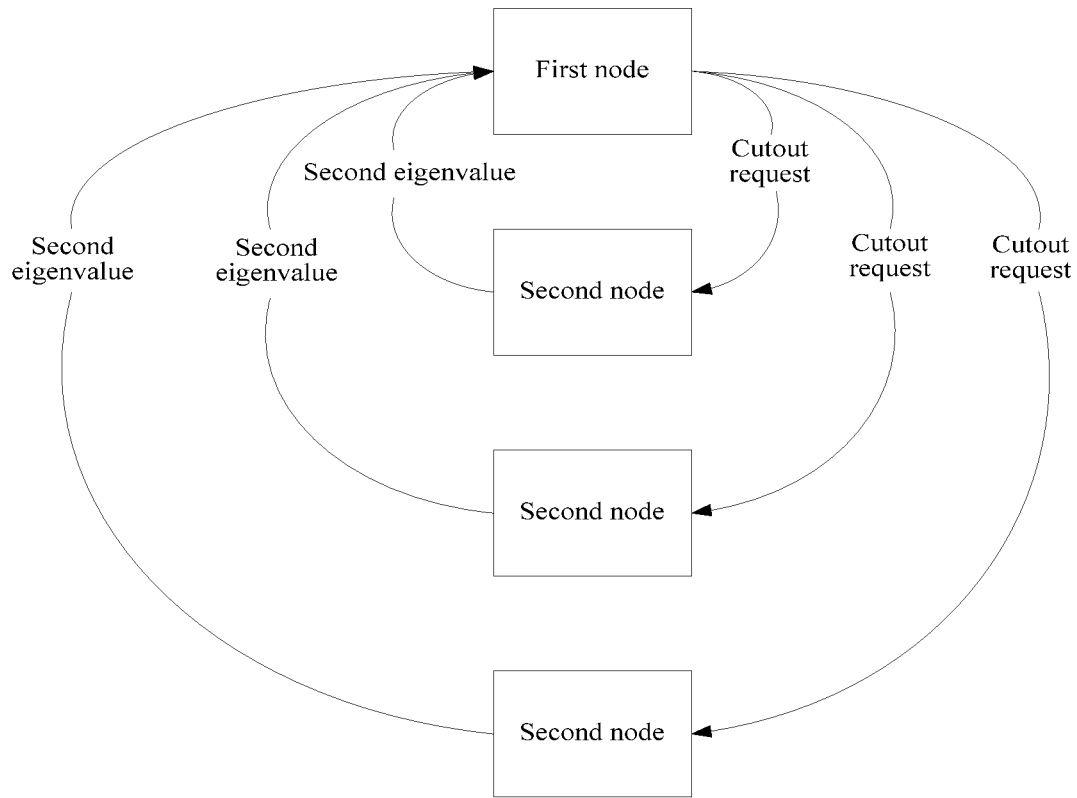

FIG. 2B

The first node determines mirror data within the range of the first block height in mirror data of the shared ledger if receiving the plurality of pieces of recovery indication information broadcast by the N−1 second nodes /209

The first node obtains a second eigenvalue of the mirror data within the range of the first block height, recovers the mirror data within the range of the first block height from the mirror data of the shared ledger, and stores the second eigenvalue into remaining mirror data /210

FIG. 2C

SHARED DATA RECOVERY METHOD AND APPARATUS, COMPUTER DEVICE, AND STORAGE MEDIUM

CROSS-REFERENCE TO RELATED APPLICATIONS

This application is a continuation application of PCT/CN2018/073884, entitled "SHARED DATA RECOVERY METHOD AND APPARATUS, COMPUTER DEVICE, AND STORAGE MEDIUM" filed on Jan. 23, 2018, which claims priority to Chinese Patent Application No. 201710055111.6, entitled "SHARED DATA RECOVERY METHOD AND APPARATUS" filed with China National Intellectual Property Administration on Jan. 24, 2017, all of which are incorporated by reference in their entireties.

FIELD OF THE TECHNOLOGY

The present disclosure relates to the field of information technologies, and in particular, to a shared data recovery method and apparatus, a computer device, and a storage medium.

BACKGROUND OF THE DISCLOSURE

With the development of information technologies, blockchain has been vigorously developed as a new technology. The blockchain technology is derived from a bitcoin technology that emerged in 2008 and is an underlying technology of bitcoins. A blockchain is a string of associated blocks generated through a cryptographic method. For example, in a scenario of storage of transaction information, when a block is generated, the block needs to be generated based on data in a previous block and current transaction information. In this way, data in each block in a blockchain is associated with data in a previous block. Therefore, it is impossible to tamper with data in a block to cheat, thereby ensuring that any data in the block is public and transparent, and improving security of transaction information.

In recent years, because of security of a blockchain in generating shared data, the blockchain technology has been frequently applied to fields such as the financial field requiring data sharing while needing to ensure security of shared data. During implementation, there may be a plurality of nodes in a data sharing system, and all the nodes may jointly maintain one piece of shared data based on the blockchain technology. For one node, after new data is generated, the node may generate a new block based on an existing blockchain, and the node sends the new block to another node of the data sharing system for storage. In this way, each node stores same shared data. Because data in the blockchain is public and transparent and can be hardly tampered with, data security and data consistency in the data sharing system can be ensured.

In a process of implementing the present disclosure, the inventor finds that a related technology has at least the following problems: With a constant increase in data in a blockchain, storage space required for storage of shared data by each node of a data sharing system is increasing. Consequently, in an environment of generating data frequently, a data amount of shared data sharply increases, and storage space required for storage of shared data by each node rapidly expands, causing pressure on each node of the data sharing system to store the shared data. Therefore, a shared data recovery method is urgently needed to reduce storage pressure on the node of the data sharing system while ensuring security and data consistency.

SUMMARY

The present disclosure provides a shared data recovery method and apparatus, a computer device, and a storage medium, to reduce pressure on a node of a data sharing system to store shared data while ensuring consistency and security of data included in a blockchain.

According to a first aspect of embodiments of the present disclosure, a shared data recovery method is performed at a first node, the first node being any node of a data sharing system, and the method including:

obtaining a first eigenvalue of the first node after receiving a recovery request carrying a first block height, the first eigenvalue being used to uniquely indicate data within a range of the first block height in shared data stored by the first node;

broadcasting the first eigenvalue to at least one second node of the data sharing system, the second node being a node other than the first node;

broadcasting recovery indication information to the at least one second node after receiving a plurality of second eigenvalues broadcast by the at least one second node, each second eigenvalue being used to uniquely indicate data within the range of the first block height in shared data stored by the second node;

determining, based on the first eigenvalue and the plurality of second eigenvalues, that data within the range of the first block height in the shared data stored by all nodes of the data sharing system is consistent; and recovering the data within the range of the first block height in the shared data after receiving a preset quantity of a plurality of pieces of recovery indication information.

According to the method provided in the embodiments of the present disclosure, a first eigenvalue of a first node within a range of a first block height and a second eigenvalue of a second node within the range of the first block height are calculated, and then, when it is determined that data within the range of the first block height in shared data stored by the nodes is consistent, the data within the range of the first block height in the shared data is recovered, thereby ensuring consistency and security of data included in a block, and reducing pressure on a node of the data sharing system to store the shared data.

According to a second aspect of the embodiments of the present disclosure, a first node of a data sharing system has one or more processors, memory, and a plurality of machine readable instructions stored in the memory. The plurality of machine readable instructions, when executed by the one or more processors, cause the first node to perform the aforementioned shared data recovery method.

According to a third aspect of the embodiments of the present disclosure, a non-transitory computer readable storage medium stores a plurality of machine readable instructions in connection with a first node of a data sharing system having one or more processors. The plurality of machine readable instructions, when executed by the one or more processors, cause the first node to perform aforementioned shared data recovery method.

It should be understood that the above general descriptions and the following detailed descriptions are merely for exemplary and explanatory purposes, and cannot limit the present disclosure.

BRIEF DESCRIPTION OF THE DRAWINGS

The accompanying drawings herein are included in the specification and form a part of the specification, show embodiments that conform to the present disclosure, and are used to describe the principle of the present disclosure together with the specification.

FIG. 2B is a schematic diagram of information transmission in a data sharing system according to an exemplary embodiment;

FIG. 2C is a flowchart of a shared data recovery method according to an exemplary embodiment;

DESCRIPTION OF EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the present disclosure.

Before the present disclosure is explained and described in detail, a data sharing system in the embodiments of the present disclosure is first briefly described.

Figure 1A:
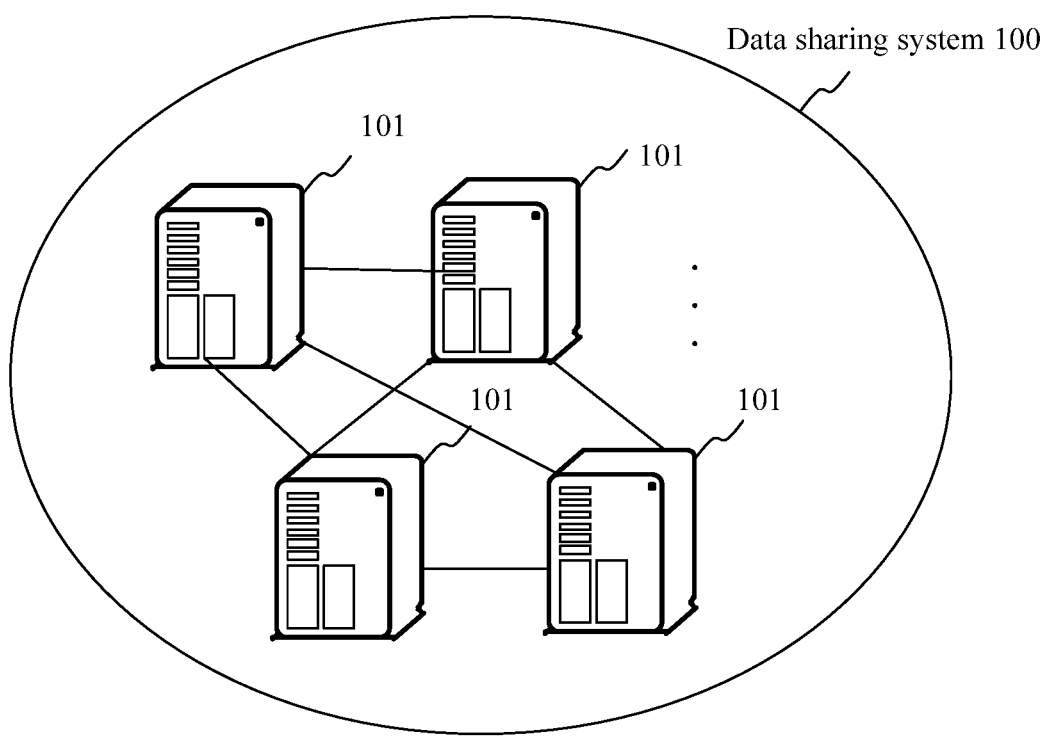
FIG. 1A is a schematic diagram of a data sharing system according to an exemplary embodiment.

Referring to FIG. 1A, a data sharing system 100 is a system for data sharing between nodes, and the data sharing system may include N nodes 101. The N nodes 101 each may be any hardware, for example, a server or a terminal, in the data sharing system, and a client configured to share data may be installed on the hardware, where N is a positive integer. Each node 101 may generate data during normal working, and maintain shared data in the data sharing system based on the data. To ensure information exchange in the data sharing system, each node of the data sharing system may have an information connection, and the nodes may transmit information through the information connection. For example, when any node of the data sharing system generates data, all the nodes of the data sharing system store the generated data as data in the shared data, so that data stored by all the nodes of the data sharing system is consistent. It should be noted that, the storage of the data by the node is may be a process of storing the data into a blockchain after a consensus between the nodes is determined based on a consensus algorithm. Details are not described in the embodiments of the present disclosure.

The data sharing system may be a transaction system. The transaction system is a system used for financial transactions. The transaction system may include N nodes. Each node generates ledger data during a transaction, and maintains a shared ledger in the transaction system based on the ledger data.

Each node of the data sharing system has a corresponding node identifier, and each node of the data sharing system may store a node identifier of another node of the data sharing system, to broadcast information to the another node of the data sharing system based on the node identifier of the another node subsequently. Each node may maintain a node identifier list shown in Table 1, and correspondingly store a node name and a node identifier into the node identifier list. A node identifier may be an Internet Protocol (IP) address and any other information that can be used to identify the node. Only an IP address in Table 1 is used for description.

TABLE 1

| Node name | Node identifier |
| --- | --- |
| Node 1 | 117.114.151.174 |
| Node 2 | 117.116.189.145 |
| ... | ... |
| Node N | 119.123.789.258 |

Figure 1B:
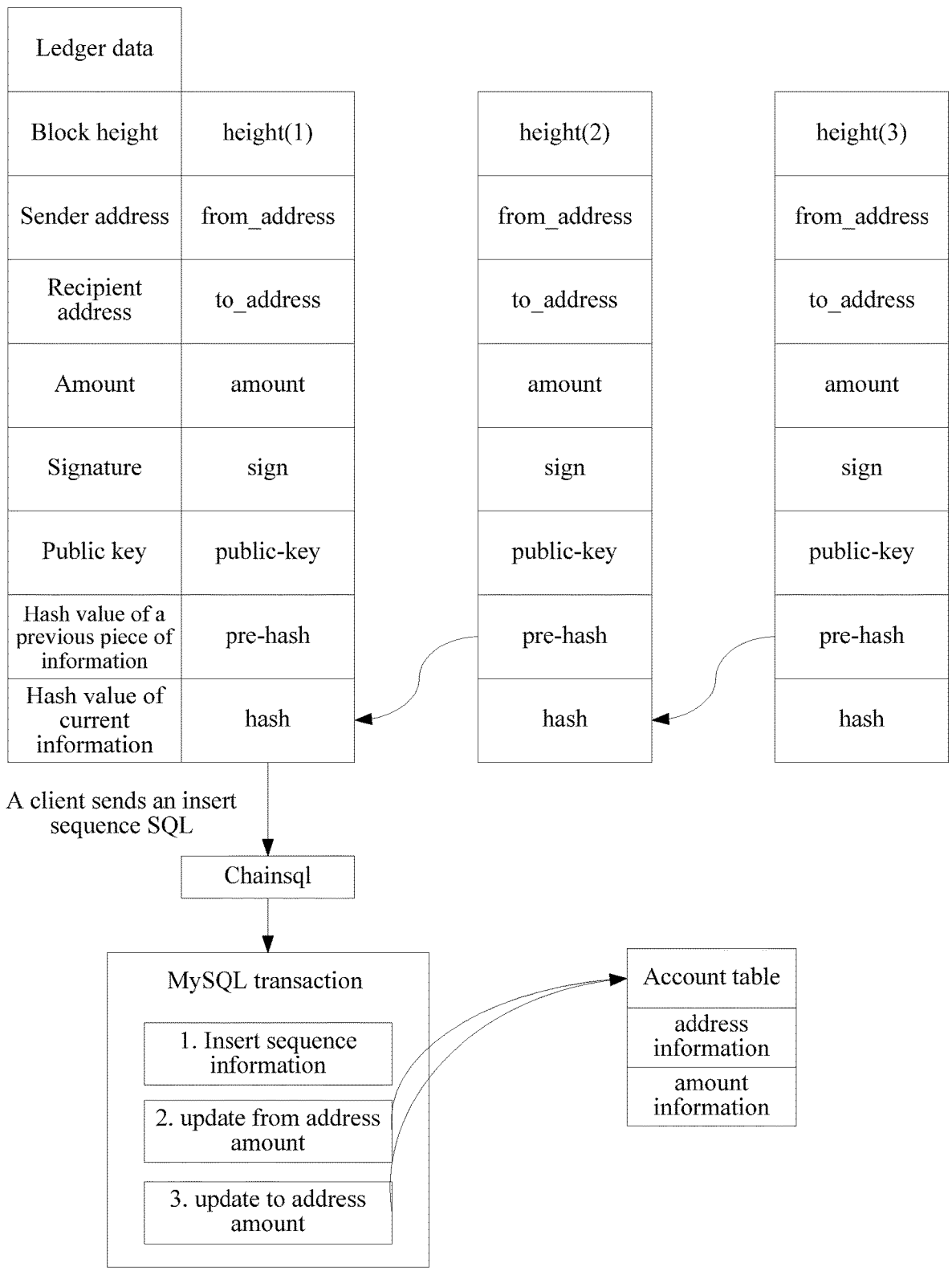
FIG. 1B is a schematic diagram of storage by a node of a data sharing system according to an exemplary embodiment.

One or more same blockchains may be configured for each node of the data sharing system. One blockchain may include a plurality of blocks. Different data is stored in the blocks. The data stored in all the blocks in the blockchain forms shared data of a node in which the blockchain is located. An example in which the data sharing system is a transaction system, the shared data is a shared ledger, and a block eigenvalue is a hash value is used for description. Referring to FIG. 1B, ledger data stored in a block includes a block height, a sender address, a recipient address, an amount, a signature, a public key, a hash value of a previous piece of information, and a hash value of current information. The block height is used to indicate a position of a current block in the blockchain in the transaction system. The sender address is used to indicate an initiation address of a transaction recorded in the current block. The recipient address is used to indicate a recipient address of the transaction recorded in the current block. The amount is a transaction value of the transaction recorded in the current block. The signature is used to identify an initiation user of the transaction recorded in the current block, and achieves a function of distinguishing between transactions initiated by different users. The public key is used to indicate a node related to ledger data stored in the current block. The hash value of the previous piece of information is a hash value generated based on ledger data stored in a previous block of the current block. The hash value of the current information is a hash value generated based on ledger data currently stored in the current block. It should be noted that, when the hash value of the current information is generated for the current block, the hash value needs to be generated based on all data in the ledger data in the block. In this way, the hash value of the current information generated for the current block is related to the hash value of the previous piece of information. Therefore, blocks in the blockchain are connected in series, and any tampering made to the ledger data can be detected by tracing an eigenvalue of a block, so that the shared ledger can be hardly tampered with, and security of the shared ledger is ensured.

In order that blocks can be connected in series to form a blockchain, and the blocks in the blockchain can be distinguished, a block height may be set in the block. The block height is used to indicate a position of a current block in the blockchain. Because different nodes include a same blockchain, block heights of blocks included in the blockchain are also the same in the different nodes.

To ensure security of data used in the data sharing system, the data sharing system may maintain a data information table and a My Structure Quest Language (MySQL, a relational database management system) transaction. An example in which the data sharing system is a transaction system, and shared data is a shared ledger is used for description. The data information table in the transaction system may be an account table. The account table is used to store detailed information in ledger data stored in a block. The detailed information involves an outflow and an inflow of a related transaction value in the ledger data, and includes address information and amount information. Both the address information and the amount information are generated based on data in the MySQL transaction. The MySQL transaction includes sequence information, an update from (transfer-out) address amount and an update to (transfer-out) address amount. The sequence information is used to indicate the outflow and the inflow of the transaction value, and may be generated based on a sender address and a recipient address in the ledger data stored in the block. The update from address amount is used to indicate a transferred-out transaction value in the sequence information, and may be generated based on an amount in the ledger data stored in the block. The update to address amount is used to indicate a transferred-in transaction value in the sequence information, and may also be generated based on an amount in the ledger data stored in the block. In this way, when the account table is generated, the address information and the amount information may be generated based on the update from address amount and the update to (transfer-out) address amount.

Figure 2A:
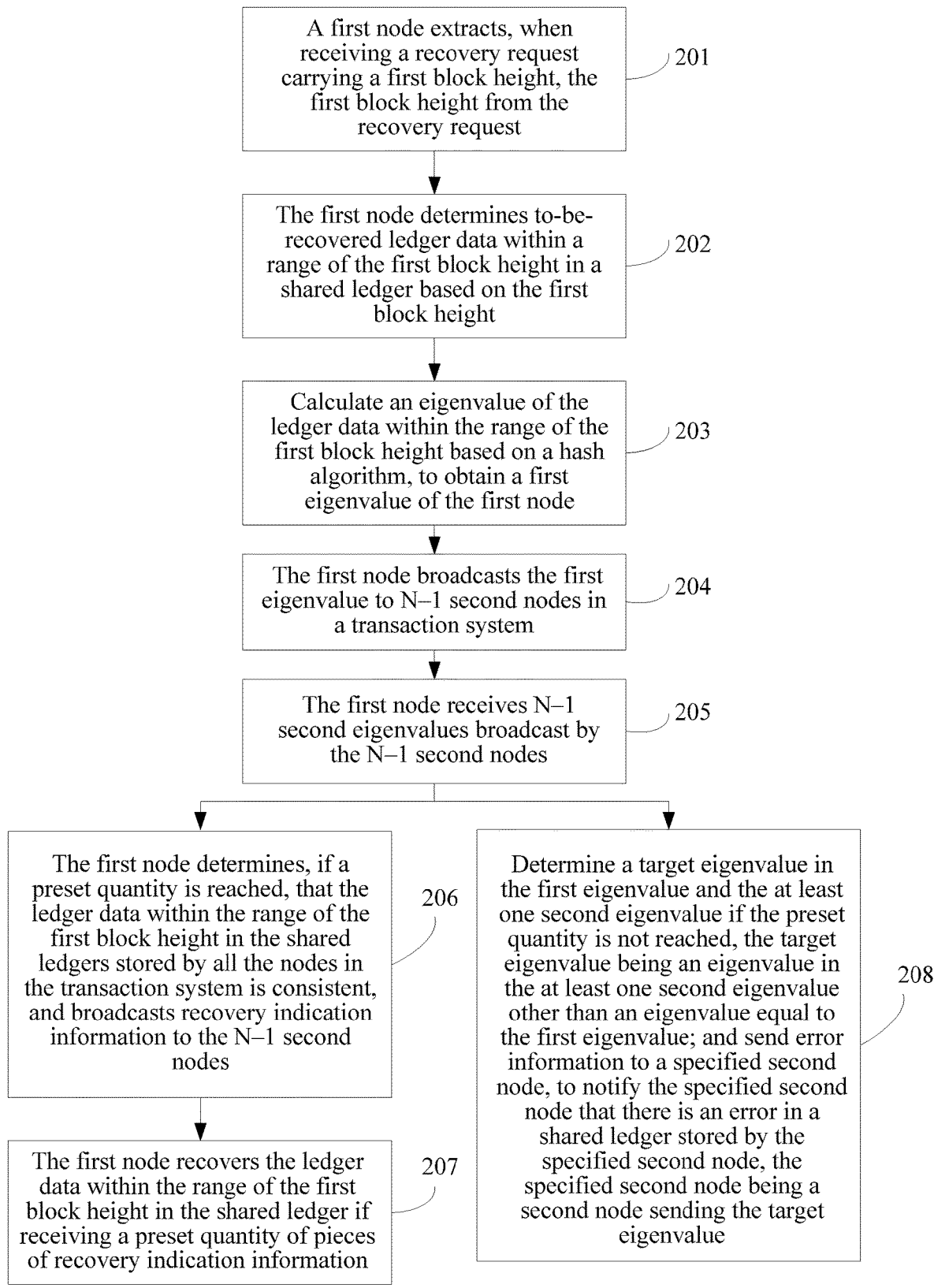
FIG. 2A is a flowchart of a shared data recovery method according to an exemplary embodiment.

FIG. 2A is a flowchart of a shared data recovery method according to an exemplary embodiment. As shown in FIG. 2A, an example in which a data sharing system is a transaction system, and shared data is a shared ledger is used. The method is applied to a first node and at least one second node in the transaction system. The transaction system includes N nodes. The method includes the following steps:

201: The first node extracts, when receiving a recovery request carrying a first block height, the first block height from the recovery request.

In this embodiment of the present disclosure, the first node may be any node in the transaction system, and the recovery request may be received from any node in the transaction system, which may be referred to as a second node in this embodiment. To reduce pressure on the node in the transaction system to store the shared ledger, the second node may initiate a recovery procedure of the shared ledger. For example, when detecting that remaining storage space is smaller than preset storage space, the second node determines the first block height based on a daily transaction information amount of the transaction system and the remaining storage space, and the second node broadcasts, to a node in the transaction system other than the second node, the recovery request carrying the first block height. In such a broadcast manner, all the nodes in the transaction system can receive the recovery request, to perform uniform data recovery, thereby ensuring data consistency.

In this embodiment of the present disclosure, only an example in which the first node receives the recovery request from the second node is used for description. That is, an example in which the second node initiates the recovery procedure of the shared ledger is used for description.

The second node may initiate the recovery procedure of the shared ledger for a plurality of reasons. For example, one reason may be that the second node initiates the recovery procedure of the shared ledger based on an actual storage status of the second node, that is, the second node may detect remaining storage space after the second node stores the shared ledger, to determine whether the shared ledger stored by the second node needs to be recovered, and initiates the recovery procedure of the shared ledger if the shared ledger stored by the second node needs to be recovered. Another reason may be that a preset period or a preset data amount is set in the transaction system, and the second node initiates the recovery procedure of the shared ledger when detecting an interval between preset periods or a data amount of the shared ledger stored by the second node reaches the preset data amount. To maintain consistency between data in the transaction system, the second node needs to send a recovery request to another node in the transaction system, to recover the shared ledger. When the recovery request is generated, the following step 1 and step 2 may be used for implementation.

Step 1: The second node determines the first block height based on the daily transaction information amount of the transaction system and the remaining storage space when detecting that the remaining storage space is smaller than the preset storage space.

When the second node detects that the remaining storage space is smaller than the preset storage space, it means that as a data amount of the ledger increases, storage pressure is caused to the second node to store the shared ledger, and the storage pressure is growing with the passage of time. Therefore, to ensure that a normal increase in the data amount of the ledger is maintained within a period of time, it may be considered to determine an amount of ledger data to be recovered based on the daily transaction information amount of the transaction system and the remaining storage space.

The transaction system may count the daily transaction information amount of the transaction system, count an amount of transaction information received by the transaction system each day, and periodically send the counted daily transaction information amount to each node in the transaction system each day. When determining the first block height based on the daily transaction information amount of the transaction system and the remaining storage space, the second node may set a day threshold, and multiply the day threshold by the daily transaction information amount, to obtain a storage space threshold, determine a space difference between the storage space threshold and the remaining storage space, use the space difference as a data amount of ledger data needing to be recovered, and determine the first block height in the shared ledger based on the data amount. The first block height carried in the recovery request actually indicates a range. That is, ledger data stored in blocks of heights being greater than or equal to the first height and less than the first block height in a blockchain is recovered, and only ledger data corresponding to the first block height and ledger data of a block height after the first block height are remained.

For different nodes, preset storage space thereof may be the same or may be different. If the nodes have a same storage capability, and remaining storage space after a shared ledger of a same amount is stored is also the same, same preset storage space may be set for the nodes. If the nodes have different storage capabilities, and remaining storage space after a shared ledger of a same amount is stored is different, different preset storage space may be set for the nodes, so that the nodes may initiate a recovery procedure of the shared ledger based on actual storage statuses of the nodes.

It should be noted that, if the preset period or the preset data amount is set in the transaction system, the second node may obtain the preset first block height from the transaction system when detecting the interval between the preset periods or the data amount of the shared ledger stored by the second node reaches the preset data amount, and initiates the recovery procedure of the shared ledger based on the preset first block height, without performing the process of determining the first block height based on the daily transaction information amount of the transaction system and the remaining storage space.

Step 2: The second node broadcasts, to at least one first node in the transaction system, the recovery request carrying the first block height.

When determining the first block height, the second node generates the recovery request based on the first block height, to enable the recovery request to carry the first block height. In addition, a recovery request carrying a second block height is broadcast to the another node in the transaction system based on a node identifier of the another node.

It should be noted that, the foregoing process of generating the recovery request may be that the second node automatically triggers generation of the recovery request and sends the recovery request when detecting that the remaining storage space is smaller than the preset storage space, or detecting the interval between the preset periods, or detecting that the data amount of the shared ledger stored by the second node reaches the preset data amount, or may be that an operator artificially triggers generation of the recovery request and sends the recovery request when the operator determines that the remaining storage space of the second node is smaller than the preset storage space, or detects the interval between the preset periods, or detects that the data amount of the shared ledger stored by the second node reaches the preset data amount. This is not specifically limited in the present disclosure.

Actually, recovery may be further initiated by a control node in the at least one second node in the transaction system. The control node may trigger generation of the recovery request and send the recovery request when detecting that remaining storage space of a plurality of nodes is smaller than the preset storage space, or detecting the interval between the preset periods, or detecting that data amounts of shared ledgers stored by the plurality of nodes reach the preset data amount.

In the foregoing embodiment, only an example in which the first node receives the recovery request from the second node is used for description. Because the first node and the second node are two nodes having an accounting function in the transaction system, the first node may also initiate the recovery procedure of the shared ledger. For ease of understanding, only an example in which the first node initiates the recovery procedure of the shared ledger is used below for description.

The first node may initiate the recovery procedure of the shared ledger for a plurality of reasons. For example, one reason may be that the first node initiates the recovery procedure of the shared ledger based on an actual storage status of the first node, that is, the first node may detect remaining storage space after the first node stores the shared ledger, to determine whether the shared ledger stored by the first node needs to be recovered, and initiates the recovery procedure of the shared ledger if the shared ledger stored by the first node needs to be recovered. Another reason may be that a preset period or a preset data amount is set in the transaction system, and the first node initiates the recovery procedure of the shared ledger when detecting an interval between preset periods or a data amount of the shared ledger stored by the first node reaches the preset data amount. To maintain consistency between data in the transaction system, the first node needs to send a recovery request to another node in the transaction system, to recover the shared ledger. When the recovery request is generated, the following step 1 and step 2 may be used for implementation.

Step 1: The first node determines a second block height based on the daily transaction information amount of the transaction system and the remaining storage space when detecting that the remaining storage space is smaller than the preset storage space. It may be understood that, the daily shared information amount of the data sharing system includes the daily transaction information amount of the transaction system.

When the first node detects that the remaining storage space is smaller than the preset storage space, it means that as a data amount of the ledger increases, storage pressure is caused to the first node to store the shared ledger, and the storage pressure is growing with the passage of time. Therefore, to ensure that a normal increase in the data amount of the ledger is maintained within a period of time, it may be considered to determine an amount of ledger data to be recovered based on the daily transaction information amount of the transaction system and the remaining storage space.

The transaction system may count the daily transaction information amount of the transaction system, count an amount of transaction information received by the transaction system each day, and periodically send the counted daily transaction information amount to each node in the transaction system each day. When determining the second block height based on the daily transaction information amount of the transaction system and the remaining storage space, the first node may set a day threshold, and multiply the day threshold by the daily transaction information amount, to obtain a storage space threshold, determine a space difference between the storage space threshold and the remaining storage space, use the space difference as a data amount of ledger data needing to be recovered, and determine the second block height in the shared ledger based on the data amount. The second block height carried in the recovery request actually indicates a range. That is, ledger data stored in blocks of heights being greater than or equal to the first height and less than the second block height in a blockchain needs to be recovered, and only ledger data corresponding to the second block height and ledger data of a block height after the second block height are remained.

For different nodes, preset storage space thereof may be the same or may be different. If the nodes have a same storage capability, and remaining storage space after a shared ledger of a same amount is stored is also the same, same preset storage space may be set for the nodes. If the nodes have different storage capabilities, and remaining storage space after a shared ledger of a same amount is stored is different, different preset storage space may be set for the nodes, so that the nodes may initiate a recovery procedure of the shared ledger based on actual storage statuses of the nodes.

It should be noted that, if the preset period or the preset data amount is set in the transaction system, the first node may obtain the preset second block height from the transaction system when detecting the interval between the preset periods or the data amount of the shared ledger stored by the first node reaches or is greater than the preset data amount, and initiates the recovery procedure of the shared ledger based on the preset second block height, without performing the process of determining the second block height based on the daily transaction information amount of the transaction system and the remaining storage space.

It may be understood that, in step 1, when it is detected that the remaining storage space of the first node is smaller than the preset storage space, the second block height may be determined based on the daily shared information amount of the data sharing system and the remaining storage space; the second block height may be determined within each preset period based on the daily shared information amount of the data sharing system; or the second block height may be determined based on the daily shared information amount of the data sharing system when it is detected that a data amount of currently stored shared data is greater than the preset data amount.

Step 2: The first node broadcasts, to the at least one second node in the transaction system, a recovery request carrying the second block height.

When determining the second block height, the first node generates the recovery request based on the second block height, to enable the recovery request to carry the second block height. In addition, the recovery request carrying the second block height is broadcast to the another node in the transaction system based on a node identifier of the another node.

It should be noted that, the foregoing process of generating the recovery request may be that the first node automatically triggers generation of the recovery request and sends the recovery request when detecting that the remaining storage space is smaller than the preset storage space, or detecting the interval between the preset periods, or detecting that the data amount of the shared ledger stored by the first node reaches the preset data amount, or may be that an operator artificially triggers generation of the recovery request and sends the recovery request when the operator determines that the remaining storage space of the first node is smaller than the preset storage space, or detects the interval between the preset periods, or detects that the data amount of the shared ledger stored by the first node reaches the preset data amount. This is not specifically limited in the present disclosure.

Actually, recovery may be further initiated by a control node in the at least one first node in the transaction system. The control node may trigger generation of the recovery request and send the recovery request when detecting that remaining storage space of a plurality of nodes is smaller than the preset storage space, or detecting the interval between the preset periods, or detecting that data amounts of shared ledgers stored by the plurality of nodes reach the preset data amount.

202: The first node determines to-be-recovered ledger data within a range of the first block height in a shared ledger based on the first block height.

In this embodiment of the present disclosure, when a blockchain stored in the node is generated, blocks included in the blockchain have consecutive block heights. The first node may determine, in a blockchain stored by the first node, based on the first block height, ledger data included within a block height range from a block height of the first block to the first block height. For example, if the block height of the first block in the blockchain is Height(1), a block height of the second block is Height(2), a block height of the third block is Height(3), a block height of the fourth block is Height(4), and a block height of the fifth block is Height(5), the first block height may be Height(3). In this way, the first node can determine, in a blockchain of the shared ledger based on the first block height, namely, Height(3), that to-be-recovered ledger data is ledger data stored in blocks indicated by the block heights, namely, Height(1) to Height (3), that is, use ledger data included in a block of a block height being Height(1) and ledger data included in a block of a block height being Height(2), as to-be-recovered ledger data.

203: Calculate an eigenvalue of the ledger data within the range of the first block height based on a hash algorithm, to obtain a first eigenvalue of the first node.

The first eigenvalue is used to uniquely indicate the data within the range of the first block height in the shared data stored by the first node. In this embodiment of the present disclosure, the first eigenvalue is obtained from the ledger data within the range of the first block height in the shared ledger stored by the first node. Step 201 to step 203 are actually a process of obtaining, by the first node, the first eigenvalue of the first node when receiving the recovery request carrying the first block height. In this embodiment of the present disclosure, the hash algorithm is used as an example, and the first eigenvalue may be a hash value of the ledger data within the range of the first block height. In an actual application process, another algorithm may alternatively be used for implementation. This is not specifically limited in the present disclosure.

204: The first node broadcasts the first eigenvalue to N−1 second nodes in the transaction system.

In this embodiment of the present disclosure, the second node is a node other than the first node. Because the first node is any node in the transaction system, after obtaining the first eigenvalue, the first node obtains N−1 node identifiers of the other N−1 second nodes, duplicates the first eigenvalue, and broadcasts the first eigenvalue to the second nodes indicated by the N−1 node identifiers, so that the N−1 nodes can all receive the same first eigenvalue. Certainly, the first eigenvalue may be alternatively sent to the N−1 second nodes in a sequential sending manner. A specific sending manner is not limited in this embodiment of the present disclosure.

For the N−1 second nodes in the transaction system, when receiving the recovery request carrying the first block height, the second node may also generate a second eigenvalue based on the first block height in the recovery request, and broadcasts the second eigenvalue in the transaction system.

205: The first node receives N−1 second eigenvalues broadcast by the N−1 second nodes.

Each second eigenvalue is used to uniquely indicate data within the range of the first block height in shared data stored by one second node. In this embodiment of the present disclosure, the second eigenvalue broadcast by the second node may be an eigenvalue of the ledger data within the range of the first block height in the shared ledger stored by the second node.

In this embodiment of the present disclosure, the following step needing to continue to be performed may be determined based on a consensus algorithm. The consensus algorithm is used to determine whether data stored by the plurality of nodes in the system is consistent, and determine, based on a quantity of nodes in which stored data is consistent, whether there is an exception in the current system. The consensus algorithm may be a Byzantine Fault Tolerance (BFT) algorithm, and may specifically use a Practical Byzantine Fault Tolerance (PBFT) algorithm. This is not specifically limited in the present disclosure. In this way, in the consensus algorithm, whether a quantity of equal eigenvalues in the plurality of second eigenvalues reaches the preset quantity may be determined by using a mechanism of 3F+1. F is a quantity of nodes that can be fault-tolerant in the current transaction system, and may be preset. When a quantity of equal eigenvalues included in the first eigenvalue and the plurality of second eigenvalues reaches the preset quantity, it is determined that the ledger data in the shared ledgers stored by the nodes in the transaction system is consistent, and the shared ledger may be recovered. That is, the following step 206 is performed.

It should be noted that, that the quantity of equal eigenvalues included in the first eigenvalue and the plurality of second eigenvalues reaches the preset quantity mentioned above also indicates that a quantity of the equal eigenvalues in the first eigenvalues and the plurality of second eigenvalues reaches the preset quantity. For example, the preset quantity is set to 3, and if the first eigenvalue of the first node is 1F8359E, and the first node receives four second eigenvalues that are respectively 1F84678E, 1F8359E, 1F8359E, and 1F8359E, there are four 1F8359E in the first eigenvalue and the four second eigenvalues. In this way, the first node may consider that the quantity of the equal eigenvalues in the first eigenvalue and the plurality of second eigenvalues reaches the preset quantity, that is, 1F8359E appears three times, and determine that the ledger data in the shared ledger stored by the nodes in the transaction system is consistent. When the quantity of equal eigenvalues included in the first eigenvalue and the plurality of second eigenvalues does not reach the preset quantity, it is determined that there are a relatively large quantity of nodes with inconsistent ledger data in the shared ledger stored by the nodes in the transaction system, causing an error in the transaction system, and the transaction system needs to be repaired, that is, the following step 208 is performed.

In a process of determining whether the quantity of equal eigenvalues included in the first eigenvalue and the plurality of second eigenvalues reach the preset quantity, whether a quantity of most equal eigenvalues included in the first eigenvalue and the plurality of second eigenvalues reaches the preset quantity is actually determined. For example, if the first the of the first node is 1F8359E, six second eigenvalues are received, and the six second eigenvalues are respectively 1F84678E, 1F84678E, 1F8359E, 1F8359E, 1F8359E, and 1F1248E, there are three second eigenvalues being 1F8359E and two second eigenvalues being 1F84678E in the second eigenvalues, that is, most second eigenvalues received by the first node are 1F8359E, the first node only needs to determine, in the first eigenvalue and the plurality of second eigenvalues, whether a quantity of eigenvalues equal to 1F8359E reaches the preset quantity, without determining whether a quantity of eigenvalues equal to 1F84678E reaches the preset quantity.

It should be noted that, step 204 and step 205 are not limited to a particular execution order. That is, the first node may first broadcast the first eigenvalue to the N−1 second nodes in the transaction system, or may first receive the N−1 second eigenvalues broadcast by the N−1 second nodes, or may perform step 204 and step 205 at the same time. This is not specifically limited in the present disclosure. When the first node receives the recovery request carrying the first block height, the N−1 second nodes also receive the recovery request, and step 201 to step 205 are performed. Therefore, the first node may receive the second eigenvalues sent by the N−1 second nodes.

The process shown in step 205 is actually also a process of determining, based on the first eigenvalue and the plurality of second eigenvalues, whether the ledger data in the shared ledgers stored by all the nodes in the transaction system is consistent, to determine whether recovery indication information needs to be broadcast to the at least one second node subsequently, thereby ensuring that the shared ledger is recovered when the ledger data in the shared ledgers stored by the nodes in the transaction system is consistent, and ensuring consistency and security of the ledger data in the shared ledgers stored by the nodes in the transaction system.

206: The first node determines, if equal eigenvalues included in the first eigenvalue and the plurality of second eigenvalues reaches a preset quantity, that the ledger data within the range of the first block height the shared ledgers stored by all the nodes in the transaction system is consistent, and broadcasts recovery indication information to the N−1 second nodes, the recovery indication information being used to instruct the node to recover the ledger data within the range of the first block height.

In this embodiment of the present disclosure, if the quantity of equal eigenvalues included in the first eigenvalue and the plurality of second eigenvalues reaches the preset quantity, it indicates that the ledger data in the shared ledgers stored by the nodes in the transaction system is consistent. In this way, the shared ledger can be recovered. Therefore, the recovery indication information is broadcast to the N−1 second nodes, so that the N−1 second nodes perform an operation of recovering the shared ledger. A process of broadcasting the recovery indication information is consistent with a process of broadcasting the first eigenvalue to the N−1 second nodes in the transaction system. Details are not described herein again.

It should be noted that, referring to FIG. 2B, because information connections exists between all the nodes in the transaction system, each of the N−1 second nodes also receives a recovery request sent by another node, and step 201 to step 205 are performed. In this way, when needing to determine, based on a second eigenvalue sent by the another node, that the ledger data in the shared ledgers stored by all the nodes in the transaction system is consistent, each of the N−1 second nodes also broadcasts recovery indication information to the another node in the transaction system. For any node in the transaction system, the node broadcasts recovery indication information to the another node in the transaction system only when determining that an eigenvalue generated by the node is equal to the received second eigenvalue sent by the another node and a quantity of equal eigenvalues reaches the preset quantity. If a node in the transaction system determines that there are equal eigenvalues in an eigenvalue generated by the node and the received second eigenvalue sent by the another node but a quantity of equal eigenvalues does not reach the preset quantity, the node does not broadcast recovery indication information to the another node.

207: The first node recovers the ledger data within the range of the first block height in the shared ledger if receiving a preset quantity of pieces of recovery indication information.

In this embodiment of the present disclosure, if the first node receives the preset quantity of pieces of recovery indication information, it indicates that the shared ledger can be recovered currently. In this way, the first node recovers to-be-recovered ledger data that is determined in the shared ledger based on the first block height.

A data recovery process mentioned in this embodiment of the present disclosure is actually a process of performing data transferring on the to-be-recovered data. A specific process is determining a preset first storage location, and transferring, to the first storage location, the to-be-recovered data that is determined in the shared data based on the first block height. Because the data may not be often accessed, the process may also be considered as a data cold backup process. Further, after the recovery, a current block eigenvalue of a block corresponding to the first block height may be further maintained on the first node, so that when the recovered data needs to be restored or traced subsequently, the data may be obtained based on the maintained current block eigenvalue of the block corresponding to the first block height, or the transferred and recovered ledger data may be obtained from the first storage location, thereby further ensuring data security, and reducing pressure on the first node to store the shared data.

It should be noted that, each of the N−1 second nodes may also receive the plurality of pieces of recovery indication information broadcast by the another node in the transaction system, and when a quantity of the received recovery indication information reaches the preset quantity, can recover to-be-recovered data that is determined in the shared ledger based on the first block height. In this way, for the shared data stored by the node of the data sharing system, after the shared data is recovered, data consistency and security of the shared data can still be maintained.

208: The first node determines a target eigenvalue in the first eigenvalue and the at least one second eigenvalue if the quantity of equal eigenvalues included in the first eigenvalue and the plurality of second eigenvalues does not reach the preset quantity, the target eigenvalue being an eigenvalue in the at least one second eigenvalue other than an eigenvalue equal to the first eigenvalue; and sends error information to a specified second node, to notify the specified second node that there is an error in shared data stored by the specified second node, the specified second node being a second node sending the target eigenvalue.

In this embodiment of the present disclosure, an example in which when the quantity of equal eigenvalues included in first eigenvalue of the first node and the plurality of second eigenvalues does not reach the preset quantity, the target eigenvalue is determined in the first eigenvalue and the at least one second eigenvalue, where the target eigenvalue is an eigenvalue in the second eigenvalue that is not equal to the first eigenvalue, and the error information is sent to the specified second node is used. However, during actual application, after determining the target eigenvalue in the first eigenvalue and the at least one second eigenvalue, each node in the transaction system sends the error information to the specified second node. The error information sent to the specified node may carry an error prompt. When receiving the error information, the specified second node needs to count a quantity of the received error information, and if the quantity of the received error information exceeds a quantity threshold, the specified second node obtains the error prompt from the error information, determines that ledger data in a shared ledger currently stored by the specified second node is inconsistent with the ledger data in the shared ledger stored by the another node in the transaction system, and obtains the shared ledger from the another node, to replace the currently stored shared ledger, so that the currently stored shared ledger is consistent with the shared ledger stored by the another node in the transaction system, to repair the transaction system.

The nodes in the transaction system may be classified into an accounting node and a non-accounting node. The accounting node is configured to: store the shared ledger in the transaction system, and continually update the shared ledger based on transaction information that is received by the transaction system each day. The non-accounting node is configured to store mirror data of the shared ledger, that is, back up the shared ledger, where data content of the mirror data is used to indicate a data change of the shared ledger. Further, the non-accounting node may also store the shared ledger. This is not specifically limited in the present disclosure.

It should be noted that, step 201 to step 208 are steps needing to be performed when the first node is an accounting node, that is, the first node stores only the shared ledger. When the first node is a non-accounting node, the first node may store both the shared ledger and the mirror data of the shared ledger. In this way, referring to FIG. 2C, when step 207 needs to be performed to recover the shared ledger, the following step 209 and step 210 may be further performed. To reduce load of the first node, the first node storing the mirror data may first perform step 207 to recover the shared ledger, and then perform the following step 209 and step 210, or may perform step 207 and the following step 209 and step 210 at the same time for data consistency and security. This is not specifically limited in the present disclosure.

209: The first node determines mirror data within the range of the first block height in mirror data of the shared data if receiving the plurality of pieces of recovery indication information broadcast by the N−1 second nodes.

In this embodiment of the present disclosure, the mirror data records a change process of the shared ledger stored by the node in the transaction system, that is, the shared ledger shows only a current status of a user account in ledger data included in the shared ledger, while the mirror data records a change of the user account in the ledger data in the shared ledger within a particular period of time. If the first node is a non-accounting node, the first node may store the shared ledger and the mirror data of the shared ledger, so that to-be-recovered mirror data can be determined in the mirror data of the shared ledger based on the first block height. A process of determining the to-be-recovered mirror data is consistent with the process of determining the to-be-recovered ledger data in step 202. Details are not described herein again.

210: The first node obtains a second eigenvalue of the mirror data within the range of the first block height, recovers the mirror data within the range of the first block height from the mirror data of the shared data, and stores the second eigenvalue into remaining mirror data.

In this embodiment of the present disclosure, the recovery request carries the first block height. During generation of the mirror data, mirror data corresponding to different blocks is also distinguished based on block heights, and block heights of the mirror data corresponding to the different blocks are consistent with block heights of the blocks in the shared ledger. Therefore, in the mirror data, the first node may obtain the second eigenvalue within the range of the first block height based on the first block height. A process of obtaining the second eigenvalue is consistent with a process of obtaining the first eigenvalue. Details are not described herein again.

After determining the second eigenvalue within the range of the first block height based on the first block height, the first node recovers the mirror data within the range of the first block height from the mirror data of the shared ledger. A process of recovering the mirror data is consistent with a process of recovering the ledger data, that is, a preset second storage location is determined, and the mirror data within the range of the first block height is transferred to the second storage location. Because the mirror data may not be often accessed, the process may be considered as a data cold backup process, and only mirror data beyond the range of the first block height is maintained. Further, the second eigenvalue may be stored into the remaining mirror data on the first node, so that when the recovered mirror data needs to be restored or traced subsequently, the recovered mirror data may be obtained based on the maintained second eigenvalue, or the recovered mirror data that is transferred may be obtained from the second storage location, thereby further ensuring security of the mirror data, and reducing pressure on the first node to store the mirror data.

For example, if the first block height is Height(3), the block height of the first block in the blockchain is Height(1), the block height of the second block is Height(2), the block height of the third block is Height(3), the block height of the fourth block is Height(4), and the block height of the fifth block is Height(5), based on the first block height Height(3), the to-be-recovered mirror data determined in the mirror data is mirror data corresponding to blocks indicated by the block heights Height(1) to Height(3), and a second eigenvalue generated based on the mirror data corresponding to the blocks indicated by the block heights Height(1) to Height(3) is 1F84678E, so that mirror data within a range of a height greater than or equal to Height(1) and less than Height(3) is recovered, that is, the mirror data within the range of the height greater than or equal to Height(1) and less than Height(3) is deleted, and only mirror data corresponding to Height(3) and mirror data after Height(3) are maintained, and 1F84678E is stored to a position corresponding to Height(3).

In this embodiment of the present disclosure, the shared data is recovered to expand the remaining storage space of the node, and there may be a plurality of specific implementations. For example, in this embodiment of the present disclosure, data is transferred to expand the remaining storage space; however, actually, the data may also be compressed to reduce a storage size of the data, thereby expanding the remaining storage space. Specifically, the first eigenvalue of the first node within the range of the first block height and the second eigenvalue of the second node within the range of the first block height may be calculated, and whether the first eigenvalue is consistent with the second eigenvalue may be determined to determine whether data within the range of the first block height in the shared data stored by the nodes is consistent, and then, the data within the range of the first block height in the shared data is compressed, so that a storage size of the shared data on each node can be reduced to a same degree, thereby ensuring consistency and security of data included in the blocks, and reducing pressure on the node of the data sharing system to store the shared data.

According to the method provided in this embodiment of the present disclosure, a first eigenvalue of a first node within a range of a first block height and a second eigenvalue of a second node within the range of the first block height are calculated, and then, when it is determined that data within the range of the first block height in shared data stored by the nodes is consistent, the data within the range of the first block height in the shared data is recovered, thereby ensuring consistency and security of data included in a block, and reducing pressure on a node of a data sharing system to store the shared data.

In another embodiment, the first block height is extracted from the recovery request, the to-be-recovered shared data within the range of the first block height is determined in the shared data based on the first block height, the eigenvalue of the data within the range of the first block height is calculated based on the hash algorithm, to obtain the first eigenvalue of the first node, thereby ensuring that all the nodes of the data sharing system can recover the shared data based on the first block height.

In another embodiment, whether the quantity of equal eigenvalues included in the first eigenvalue and the plurality of second eigenvalues reaches the preset quantity is determined, and if the preset quantity is reached, it is determined that data in the shared data stored by all the nodes of the data sharing system is consistent, and the recovery indication information is broadcast to the at least one second node, so that the recovery indication information is broadcast to the at least one second node only when the quantity of equal eigenvalues included in the first eigenvalue and the plurality of second eigenvalues reaches the preset quantity, thereby ensuring consistency and security of the shared data stored by the nodes when the shared data is recovered.

In another embodiment, when it is detected that the remaining storage space of the first node is smaller than the preset storage space, the second block height is determined based on the daily shared information amount of the data sharing system and the remaining storage space, and the recovery request carrying the second block height is broadcast to the at least one second node of the data sharing system, so that when it is detected that there is pressure on the node to store the shared data, the shared data may be immediately requests to be recovered, thereby reducing actual pressure on the node to store the shared data.

In another embodiment, if the plurality of pieces of recovery indication information broadcast by the at least one second node is received, the mirror data within the range of the first block height is determined in the mirror data of the shared data, and the second eigenvalue of the mirror data within the range of the first block height is obtained; the mirror data within the range of the first block height is recovered from the mirror data of the shared data, and the second eigenvalue is stored into remaining mirror data, so that the mirror data of the shared data may also be recovered based on the first block height, thereby further reducing pressure on the node to store the shared data.

Figure 3A:
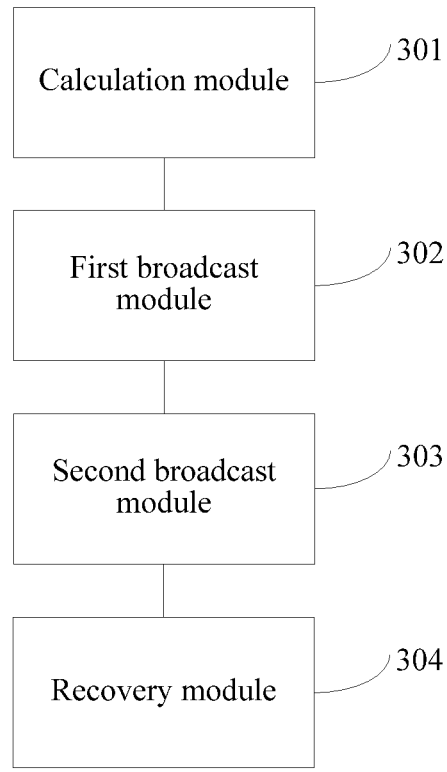
FIG. 3A is a block diagram of a shared data recovery apparatus according to an exemplary embodiment.

FIG. 3A is a block diagram of a shared data recovery apparatus according to an exemplary embodiment. Referring to FIG. 3A, the apparatus includes a calculation module 301, a first broadcast module 302, a second broadcast module 303, and a recovery module 304.

The calculation module 301 is configured to obtain a first eigenvalue of the first node after receiving a recovery request carrying a first block height, the first eigenvalue being used to uniquely indicate data within a range of the first block height in shared data stored by the first node.

The first broadcast module 302 is configured to broadcast the first eigenvalue to at least one second node of the data sharing system, the second node being a node other than the first node.

The second broadcast module 303 is configured to broadcast recovery indication information to the at least one second node when receiving a plurality of second eigenvalues broadcast by the at least one second node and if determining, based on the first eigenvalue and the plurality of second eigenvalues, that data within the range of the first block height in shared data stored by all nodes of the data sharing system is consistent, each second eigenvalue being used to uniquely indicate data within the range of the first block height in shared data stored by the second node.

The recovery module 304 is configured to recover the data within the range of the first block height in the shared data after receiving a preset quantity of a plurality of pieces of recovery indication information.

The apparatus provided in this embodiment of the present disclosure calculates a first eigenvalue of a first node within a range of a first block height and a second eigenvalue of a second node within the range of the first block height, and then, when determining that data within the range of the first block height in shared data stored by the nodes is consistent, recovers the data within the range of the first block height in the shared data, thereby ensuring consistency and security of data included in a block, and reducing pressure on a node of a data sharing system to store the shared data.

Figure 3B:
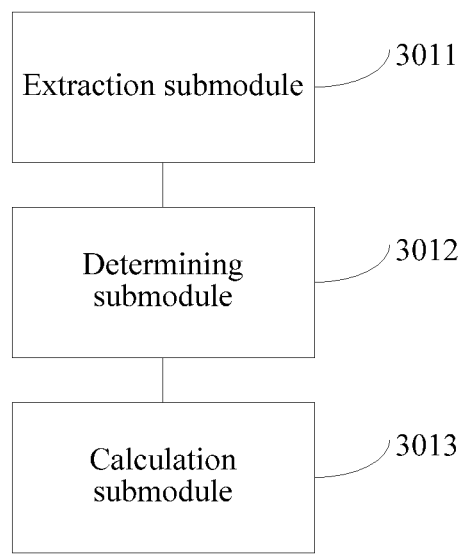
FIG. 3B is a block diagram of a shared data recovery apparatus according to an exemplary embodiment.

In another embodiment, referring to FIG. 3B, the calculation module 301 includes an extraction submodule 3011, a determining submodule 3012, and a calculation submodule 3013.

The extraction submodule 3011 is configured to extract the first block height from the recovery request.

The determining submodule 3012 is configured to determine, in the shared data based on the first block height, to-be-recovered data within the range of the first block height.

The calculation submodule 3013 is configured to calculate an eigenvalue of the data within the range of the first block height based on a hash algorithm, to obtain the first eigenvalue of the first node.

In another embodiment, the second broadcast module 304 is configured to: determine, when a quantity of equal eigenvalues included in the first eigenvalue and the plurality of second eigenvalues reaches the preset quantity, that the data within the range of the first block height in the shared data stored by all the nodes of the data sharing system is consistent, and broadcast the recovery indication information to the at least one second node.

Figure 3C:
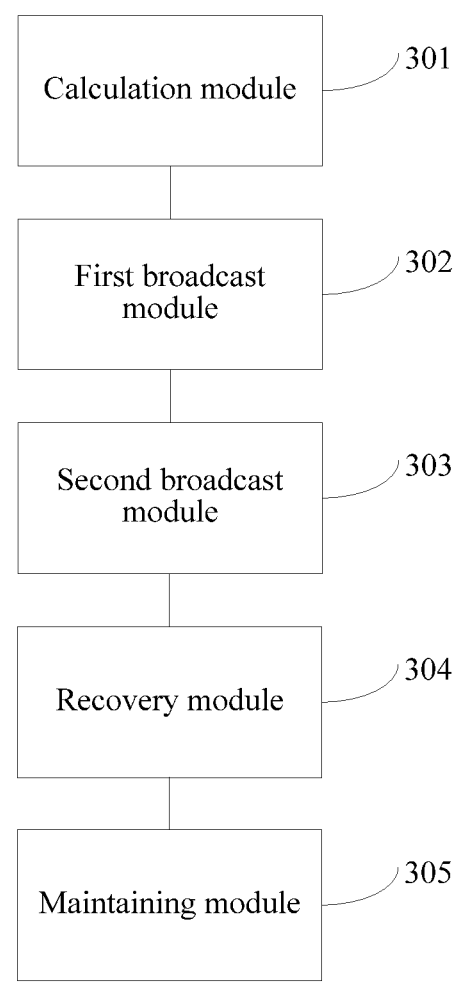
FIG. 3C is a block diagram of a shared data recovery apparatus according to an exemplary embodiment.

In another embodiment, referring to FIG. 3C, the apparatus further includes a maintaining module 305.

The maintaining module 305 is configured to maintain a current block eigenvalue of a block corresponding to the first block height.

Figure 3D:
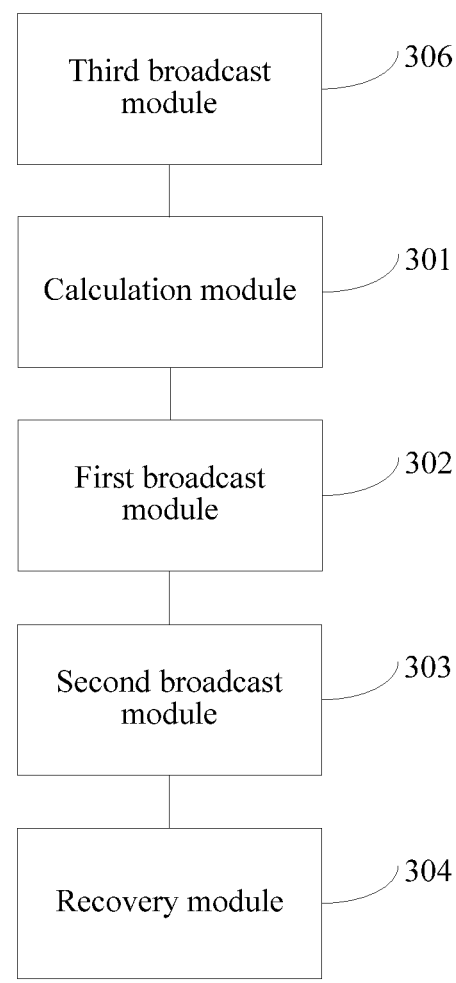
FIG. 3D is a block diagram of a shared data recovery apparatus according to an exemplary embodiment.

In another embodiment, referring to FIG. 3D, the apparatus further includes a third broadcast module 306.

The third broadcast module 306 is configured to: determine, when detecting that remaining storage space of the first node is smaller than preset storage space, a second block height based on a daily shared information amount of the data sharing system and the remaining storage space; and broadcast, to the at least one second node of the data sharing system, a recovery request carrying the second block height; or determine a second block height within each preset period based on a daily shared information amount of the data sharing system; and broadcast, to the at least one second node of the data sharing system, a recovery request carrying the second block height; or determine a second block height based on a daily shared information amount of the data sharing system when detecting that a data amount of currently stored shared data is greater than a preset data amount; and broadcast, to the at least one second node of the data sharing system, a recovery request carrying the second block height.

Figure 3E:
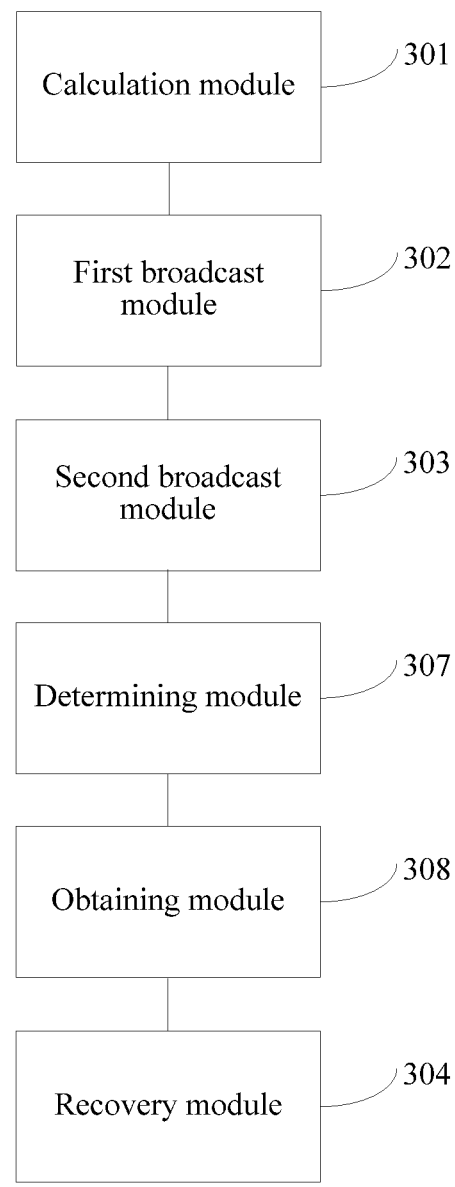
FIG. 3E is a block diagram of a shared data recovery apparatus according to an exemplary embodiment.

In another embodiment, referring to FIG. 3E, the apparatus further includes a determining module 307 and an obtaining module 308.

The determining module 307 is configured to determine, in mirror data of the shared data, mirror data within the range of the first block height if receiving a plurality of pieces of recovery indication information broadcast by the at least one second node.

The obtaining module 308 is configured to obtain a second eigenvalue of the mirror data within the range of the first block height.

The recovery module 304 is further configured to recover the mirror data within the range of the first block height from the mirror data of the shared data, and store the second eigenvalue into remaining mirror data.

Specific manners of performing operations by the modules in the apparatus in the foregoing embodiment have been described in detail in the embodiments related to the method. Details are not described herein again.

The method provided in the embodiments of the present disclosure is applicable to any node of the data sharing system. The node may be any computer device. The computer device includes a processor and a memory. The memory stores at least one instruction. The instruction is loaded and executed by the processor to implement the following method:

obtaining a first eigenvalue of the computer device when receiving a recovery request carrying a first block height, the first eigenvalue being used to uniquely indicate data within a range of the first block height in shared data stored by the computer device;

broadcasting the first eigenvalue to a computer device in the data sharing system other than the computer device;

broadcasting recovery indication information to the computer device other than the computer device when receiving a plurality of second eigenvalues broadcast by the computer device other than the computer device and if determining, based on the first eigenvalue and the plurality of second eigenvalues, that data within the range of the first block height in shared data stored by all the nodes of the data sharing system is consistent, each second eigenvalue being used to uniquely indicate data within the range of the first block height in shared data stored by the computer device other than the computer device; and recovering the data within the range of the first block height in the shared data after receiving a preset quantity of a plurality of pieces of recovery indication information.

In a possible implementation, the instruction is further loaded and executed by the processor to implement the following method:

extracting the first block height from the recovery request;

determining, in the shared data based on the first block height, to-be-recovered data within the range of the first block height; and calculating an eigenvalue of the data within the range of the first block height based on a hash algorithm, to obtain a first eigenvalue of the computer device.

In a possible implementation, the instruction is further loaded and executed by the processor to implement the following method:

determining whether a quantity of equal eigenvalues included in the first eigenvalue and the plurality of second eigenvalues reaches the preset quantity; and determining, if the preset quantity is reached, that data within the range of the first block height in shared data stored by all computer devices in the data sharing system is consistent, and broadcasting the recovery indication information to the computer device other than the computer device.

In a possible implementation, the instruction is further loaded and executed by the processor to implement the following method:

maintaining a current block eigenvalue of a block corresponding to the first block height.

In a possible implementation, the instruction is further loaded and executed by the processor to implement the following method:

determining, when detecting that remaining storage space of the computer device is smaller than preset storage space, a second block height based on a daily shared information amount of the data sharing system and the remaining storage space; and broadcasting, to the computer device in the data sharing system other than the computer device, a recovery request carrying the second block height; or determining a second block height within each preset period based on a daily shared information amount of the data sharing system; and broadcasting, to the computer device in the data sharing system other than the computer device, a recovery request carrying the second block height; or determining a second block height based on a daily shared information amount of the data sharing system when detecting that a data amount of currently stored shared data is greater than a preset data amount; and broadcasting, to the computer device in the data sharing system other than the computer device, a recovery request carrying the second block height.

In a possible implementation, the instruction is further loaded and executed by the processor to implement the following method:

determining, in mirror data of the shared data, mirror data within the range of the first block height if receiving a plurality of pieces of recovery indication information broadcast by the computer device other than the computer device;

obtaining a second eigenvalue of the mirror data within the range of the first block height; and recovering the mirror data within the range of the first block height from the mirror data of the shared data, and storing the second eigenvalue into remaining mirror data.

Figure 4:
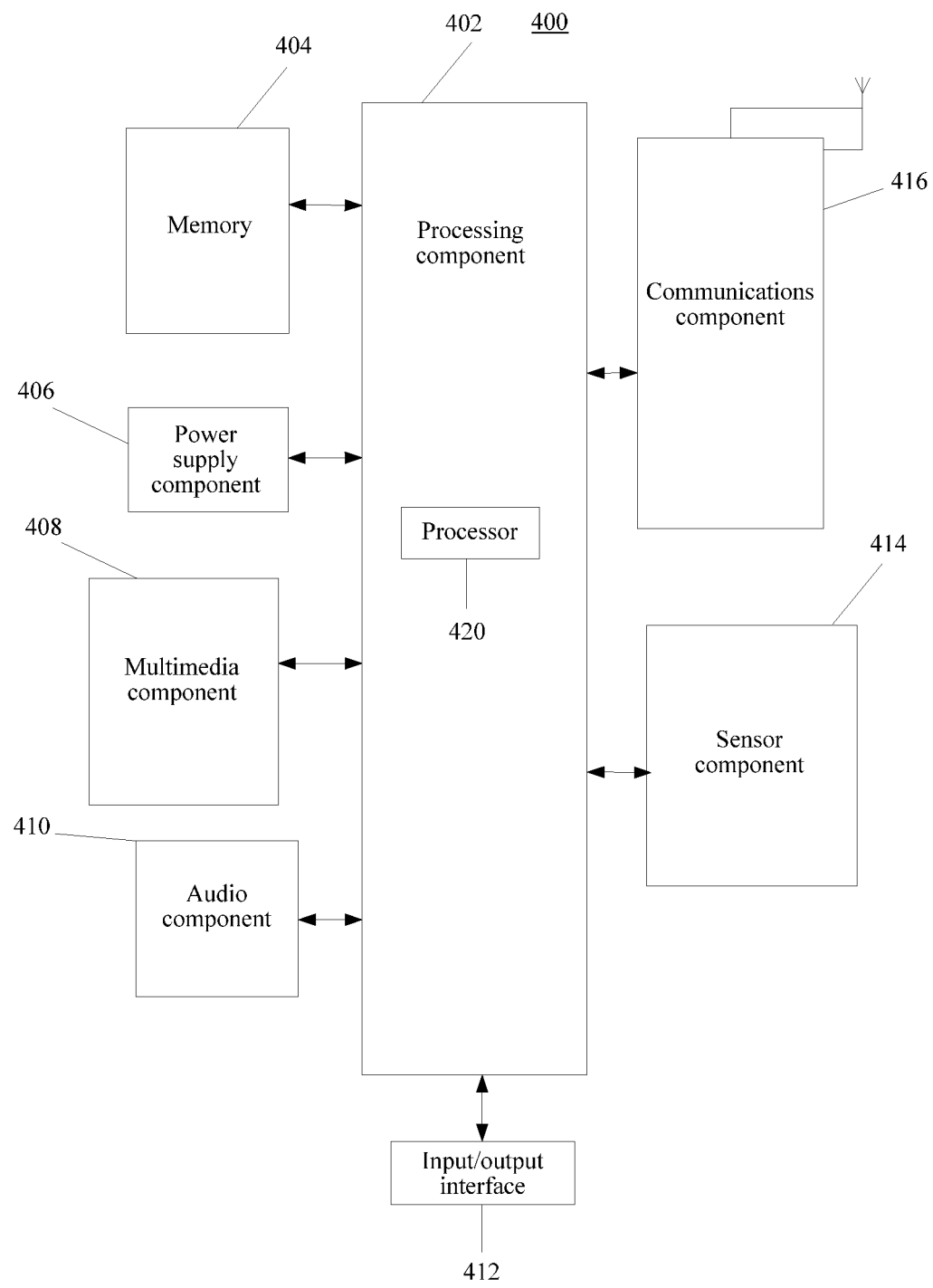
FIG. 4 is a block diagram of a terminal 400 according to an exemplary embodiment.
Figure 5:
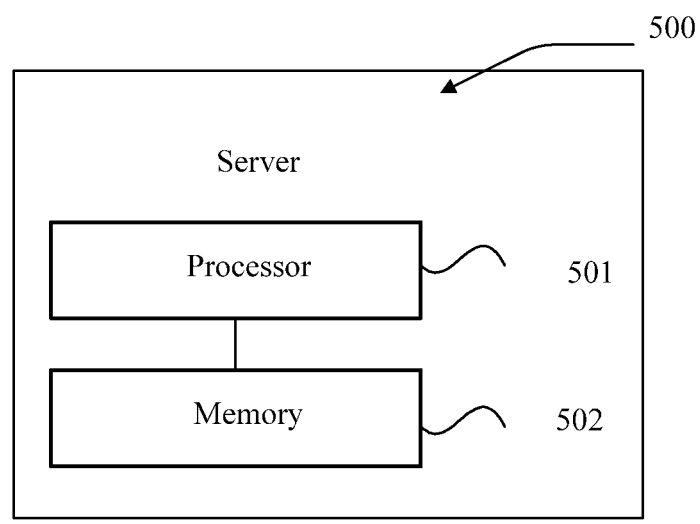
FIG. 5 is a schematic structural diagram of a server according to an embodiment of the present disclosure.

The computer device used as a node may use a form of a terminal, for example, a terminal 400 shown in FIG. 4, or may use a form of a server, for example, a server 500 shown in FIG. 5. FIG. 4 is a block diagram of the terminal 400 according to an exemplary embodiment. For example, the terminal 400 may be a mobile phone, a computer, a digital broadcasting terminal, a message transceiver device, a game console, a tablet device, a medical device, fitness equipment, or a personal digital assistant.

Referring to FIG. 4, the terminal 400 may include one or more of the following components: a processing component 402, a memory 404, a power supply component 406, a multimedia component 408, an audio component 410, an input/output (I/O) interface 412, a sensor component 414, and a communications component 416.

The processing component 402 generally controls an overall operation of terminal 400, for example, operations associated with display, a telephone call, data communications, a camera operation, and a recording operation. The processing component 402 may include one or more processors 420 for executing an instruction, to complete all or some of the steps of the foregoing method. In addition, the processing component 402 may include one or more modules, to facilitate interaction between the processing component 402 and another component. For example, the processing component 402 may include a multimedia module to facilitate interaction between the multimedia component 408 and the processing component 402.

The memory 404 is configured to store various types of data to support operations on the terminal 400. Examples of the data include instructions, contact data, phonebook data, messages, pictures, videos, and the like of any application program or method to be operated on the terminal 400. The memory 404 may be implemented by any type of volatile or nonvolatile storage device or a combination thereof, such as a static random access memory (SRAM), an electrically-erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power supply component 406 supplies power to components of the terminal 400. The power supply component 406 may include a power supply management system, one or more power supplies, and other components associated with generating, managing and allocating power for the terminal 800.

The multimedia component 408 includes a screen of an output interface provided between the terminal 400 and a user. In some embodiments, the screen may include a liquid crystal display (LCD) and a touch panel (TP). If the screen includes a TP, the screen may be implemented as a touchscreen, to receive an input signal from the user. The TP includes one or more touch sensors to sense touching, sliding, and gestures on the TP. The touch sensor may not only sense the boundary of touching or sliding operations, but also detect duration and pressure related to the touching or sliding operations. In some embodiments, the multimedia component 408 includes a front-facing camera and/or a rear-facing camera. When the terminal 400 is in an operation mode, such as a shoot mode or a video mode, the front-facing camera and/or the rear-facing camera may receive external multimedia data. Each front-facing camera and rear-facing camera may be a fixed optical lens system or have a focal length and an optical zooming capability.

The audio component 410 is configured to output and/or input an audio signal. For example, the audio component 410 includes a microphone (MIC), and when the terminal 400 is in an operation mode, such as a call mode, a recording mode, and a voice identification mode, the MIC is configured to receive an external audio signal. The received audio signal may be further stored in the memory 404 or sent through the communications component 416. In some embodiments, the audio component 410 further includes a speaker, configured to output an audio signal.

The I/O interface 412 provides an interface between the processing component 402 and an external interface module. The external interface module may be a keyboard, a click wheel, buttons, or the like. The buttons may include, but are not limited to: a homepage button, a volume button, a start-up button, and a locking button.

The sensor component 414 includes one or more sensors, configured to provide status evaluation in each aspect to the terminal 400. For example, the sensor component 414 may detect an opened/closed status of the device 400, and relative positioning of the component. For example, the component is a display and a small keyboard of the terminal 400. The sensor component 414 may further detect a position change of the terminal 400 or one component of the terminal 400, the existence or nonexistence of contact between the user and the terminal 400, an azimuth or acceleration/deceleration of the terminal 400, and a temperature change of the terminal 400. The sensor component 414 may include a proximity sensor, configured to detect the existence of nearby objects without any physical contact. The sensor component 414 may further include an optical sensor, such as a complementary metal oxide semiconductor (CMOS) or a charge-coupled device (CCD) image sensor, to be used in an imaging application. In some embodiments, the sensor component 414 may further include an acceleration sensor, a gyroscope sensor, a magnetic sensor, a pressure sensor, or a temperature sensor.

The communications component 416 is configured to facilitate communication in a wired or wireless manner between the terminal 400 and other devices. The terminal 400 may access a wireless network based on communication standards, such as Wi-Fi, 2G, or 3G, or a combination thereof. In an exemplary embodiment, the communications component 416 receives a broadcast signal or broadcast related information from an external broadcast management system via a broadcast channel. In an exemplary embodiment, the communications component 416 may further include a near field communication (NFC) module, to promote short range communication. For example, the NFC module may be implemented based on a radio frequency identification (RFID) technology, an infra-red data association (IrDA) technology, an ultra-wideband (UWB) technology, a Bluetooth (BT) technology, and other technologies.

In an exemplary embodiment, the terminal 400 may be implemented by one or more application-specific integrated circuits (ASIC), digital signal processors (DSP), digital signal processor devices (DSPD), programmable logic devices (PLD), field programmable gate arrays (FPGA), controllers, microcontrollers, microprocessors, or other electronic components, and is configured to perform the foregoing shared data recovery method.

In an exemplary embodiment, a non-transitory computer-readable storage medium including an instruction is further provided, for example, the memory 404 including an instruction, and the foregoing instruction may be executed by the processor 420 of the terminal 400 to complete the foregoing method. For example, the non-transitory computer-readable storage medium may be a ROM, a random access memory (RAM), a compact disc read-only memory (CD-ROM), a magnetic tape, a floppy disk, an optical data storage device, or the like.

In addition, the foregoing shared data recovery method is further applicable to a server. FIG. 5 is a schematic structural diagram of a server according to an embodiment of the present disclosure. The server 500 may vary greatly due to different configurations or performance, and may include one or more central processing units (CPU) 501, and one or more memories 502. The memory 502 stores at least one instruction. The at least one instruction is loaded and executed by the processor 501 to implement the shared data recovery method provided in the foregoing method embodiments. Certainly, the server may further include components such as a wired or wireless network interface, a keyboard, and an I/O interface, for inputting and outputting. The server may further include another component configured to implement a device function. Details are not described herein again.

In an exemplary embodiment, a computer-readable storage medium is further provided, for example, a memory including an instruction. The foregoing instruction may be executed by the processor of the terminal to complete the shared data recovery method in the foregoing embodiments. For example, the computer-readable storage medium may be a ROM, a RAM, a CD-ROM, a magnetic tape, a floppy disk, or an optical data storage device.

After considering the specification and practicing the present disclosure, a person skilled in the art would easily conceive of other implementations of the present disclosure. This application is intended to cover any variation, use, or adaptive change of the present disclosure. These variations, uses, or adaptive changes follow the general principles of the present disclosure and include common general knowledge or common technical means in the art that are not disclosed in the present disclosure. The specification and the embodiments are considered as merely exemplary, and the real scope and spirit of the present disclosure are pointed out in the following claims.

It should be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A shared data recovery method performed at a first node, the first node being any node of a data sharing system, and the method comprising:
   obtaining a first eigenvalue of the first node after receiving a recovery request carrying a first block height, the first eigenvalue being used to uniquely indicate data within a range of the first block height in shared data stored by the first node;
   broadcasting the first eigenvalue to at least one second node of the data sharing system, the second node being a node other than the first node;
   broadcasting recovery indication information to the at least one second node after receiving a plurality of second eigenvalues broadcast by the at least one second node, each second eigenvalue being used to uniquely indicate data within the range of the first block height in shared data stored by the second node;
   determining, based on the first eigenvalue and the plurality of second eigenvalues, that data within the range of the first block height in the shared data stored by all nodes of the data sharing system is consistent; and
   recovering the data within the range of the first block height in the shared data after receiving a preset quantity of a plurality of pieces of recovery indication information.

2. The method according to claim 1, wherein the obtaining a first eigenvalue of the first node comprises:
   extracting the first block height from the recovery request;
   determining, in the shared data based on the first block height, to-be-recovered data within the range of the first block height; and
   calculating an eigenvalue of the data within the range of the first block height based on a hash algorithm, to obtain the first eigenvalue of the first node.

3. The method according to claim 1, wherein the determining, based on the first eigenvalue and the plurality of second eigenvalues, that data within the range of the first block height in shared data stored by all nodes of the data sharing system is consistent further comprises:
   determining, when a quantity of equal eigenvalues comprised in the first eigenvalue and the plurality of second eigenvalues reaches the preset quantity, that the data within the range of the first block height in the shared data stored by all the nodes of the data sharing system is consistent, and broadcasting the recovery indication information to the at least one second node.

4. The method according to claim 1, wherein after the recovering the data within the range of the first block height in the shared data after receiving a preset quantity of a plurality of pieces of recovery indication information, the method further comprises:
   maintaining a current block eigenvalue of a block corresponding to the first block height.

5. The method according to claim 1, wherein the method further comprises:
  determining, when detecting that remaining storage space of the first node is smaller than preset storage space, a second block height based on a daily shared information amount of the data sharing system and the remaining storage space; and broadcasting, to the at least one second node of the data sharing system, a recovery request carrying the second block height.

6. The method according to claim 1, wherein the method further comprises:
  determining a second block height within each preset period based on a daily shared information amount of the data sharing system; and broadcasting, to the at least one second node of the data sharing system, a recovery request carrying the second block height.

7. The method according to claim 1, wherein the method further comprises:
  determining a second block height based on a daily shared information amount of the data sharing system when detecting that a data amount of currently stored shared data is greater than a preset data amount; and broadcasting, to the at least one second node of the data sharing system, a recovery request carrying the second block height.

8. The method according to claim 1, wherein the method further comprises:
  determining, in mirror data of the shared data, mirror data within the range of the first block height if receiving a plurality of pieces of recovery indication information broadcast by the at least one second node;
  obtaining a second eigenvalue of the mirror data within the range of the first block height; and
  recovering the mirror data within the range of the first block height from the mirror data of the shared data, and storing the second eigenvalue into remaining mirror data.

9. A first node of a data sharing system, the first node comprising: one or more processors, memory, and a plurality of machine readable instructions stored in the memory, wherein the plurality of machine readable instructions, when executed by the one or more processors, cause the first node to perform a plurality of operations including:
  obtaining a first eigenvalue of the first node after receiving a recovery request carrying a first block height, the first eigenvalue being used to uniquely indicate data within a range of the first block height in shared data stored by the first node;
  broadcasting the first eigenvalue to at least one second node of the data sharing system, the second node being a node other than the first node;
  broadcasting recovery indication information to the at least one second node after receiving a plurality of second eigenvalues broadcast by the at least one second node, each second eigenvalue being used to uniquely indicate data within the range of the first block height in shared data stored by the second node;
  determining, based on the first eigenvalue and the plurality of second eigenvalues, that data within the range of the first block height in the shared data stored by all nodes of the data sharing system is consistent; and
  recovering the data within the range of the first block height in the shared data after receiving a preset quantity of a plurality of pieces of recovery indication information.

10. The first node according to claim 9, wherein the obtaining a first eigenvalue of the first node comprises:
  extracting the first block height from the recovery request;
  determining, in the shared data based on the first block height, to-be-recovered data within the range of the first block height; and
  calculating an eigenvalue of the data within the range of the first block height based on a hash algorithm, to obtain the first eigenvalue of the first node.

11. The first node according to claim 9, wherein the determining, based on the first eigenvalue and the plurality of second eigenvalues, that data within the range of the first block height in shared data stored by all nodes of the data sharing system is consistent further comprises:
  determining, when a quantity of equal eigenvalues comprised in the first eigenvalue and the plurality of second eigenvalues reaches the preset quantity, that the data within the range of the first block height in the shared data stored by all the nodes of the data sharing system is consistent, and broadcasting the recovery indication information to the at least one second node.

12. The first node according to claim 9, wherein the plurality of operations further comprise:
  after recovering the data within the range of the first block height in the shared data after receiving a preset quantity of a plurality of pieces of recovery indication information, maintaining a current block eigenvalue of a block corresponding to the first block height.

13. The first node according to claim 9, wherein the plurality of operations further comprise:
  determining, when detecting that remaining storage space of the first node is smaller than preset storage space, a second block height based on a daily shared information amount of the data sharing system and the remaining storage space; and broadcasting, to the at least one second node of the data sharing system, a recovery request carrying the second block height.

14. The first node according to claim 9, wherein the plurality of operations further comprise:
  determining a second block height within each preset period based on a daily shared information amount of the data sharing system; and broadcasting, to the at least one second node of the data sharing system, a recovery request carrying the second block height.

15. The first node according to claim 9, wherein the plurality of operations further comprise:
  determining a second block height based on a daily shared information amount of the data sharing system when detecting that a data amount of currently stored shared data is greater than a preset data amount; and broadcasting, to the at least one second node of the data sharing system, a recovery request carrying the second block height.

16. The first node according to claim 9, wherein the plurality of operations further comprise:
  determining, in mirror data of the shared data, mirror data within the range of the first block height if receiving a plurality of pieces of recovery indication information broadcast by the at least one second node;
  obtaining a second eigenvalue of the mirror data within the range of the first block height; and
  recovering the mirror data within the range of the first block height from the mirror data of the shared data, and storing the second eigenvalue into remaining mirror data.

17. A non-transitory computer readable storage medium storing a plurality of machine readable instructions in connection with a first node of a data sharing system having one or more processors, wherein the plurality of machine readable instructions, when executed by the one or more processors, cause the first node to perform a plurality of operations including:
- obtaining a first eigenvalue of the first node after receiving a recovery request carrying a first block height, the first eigenvalue being used to uniquely indicate data within a range of the first block height in shared data stored by the first node;
- broadcasting the first eigenvalue to at least one second node of the data sharing system, the second node being a node other than the first node;
- broadcasting recovery indication information to the at least one second node after receiving a plurality of second eigenvalues broadcast by the at least one second node, each second eigenvalue being used to uniquely indicate data within the range of the first block height in shared data stored by the second node;
- determining, based on the first eigenvalue and the plurality of second eigenvalues, that data within the range of the first block height in the shared data stored by all nodes of the data sharing system is consistent; and
- recovering the data within the range of the first block height in the shared data after receiving a preset quantity of a plurality of pieces of recovery indication information.

18. The non-transitory computer readable storage medium according to claim 17, wherein the obtaining a first eigenvalue of the first node comprises:
- extracting the first block height from the recovery request;
- determining, in the shared data based on the first block height, to-be-recovered data within the range of the first block height; and
- calculating an eigenvalue of the data within the range of the first block height based on a hash algorithm, to obtain the first eigenvalue of the first node.

19. The non-transitory computer readable storage medium according to claim 17, wherein the determining, based on the first eigenvalue and the plurality of second eigenvalues, that data within the range of the first block height in shared data stored by all nodes of the data sharing system is consistent further comprises:
- determining, when a quantity of equal eigenvalues comprised in the first eigenvalue and the plurality of second eigenvalues reaches the preset quantity, that the data within the range of the first block height in the shared data stored by all the nodes of the data sharing system is consistent, and broadcasting the recovery indication information to the at least one second node.

20. The non-transitory computer readable storage medium according to claim 17, wherein the plurality of operations further comprise:
- after recovering the data within the range of the first block height in the shared data after receiving a preset quantity of a plurality of pieces of recovery indication information, maintaining a current block eigenvalue of a block corresponding to the first block height.

* * * * *